United States Patent
Duis et al.

(10) Patent No.: US 11,733,541 B2
(45) Date of Patent: *Aug. 22, 2023

(54) PHOTOCHROMIC SOFT CONTACT LENS WITH COSMETIC AND EFFICACY CONSIDERATIONS

(71) Applicant: Johnson & Johnson Vision Care, Inc., Jacksonville, FL (US)

(72) Inventors: Donnie Duis, Jacksonville, FL (US); Pierre-Yves Gerligand, St. Johns, FL (US); Leilani Keahi Sonoda, Atlantic Beach, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 89 days.

This patent is subject to a terminal disclaimer.

(21) Appl. No.: 17/379,162

(22) Filed: Jul. 19, 2021

(65) Prior Publication Data

US 2021/0349333 A1 Nov. 11, 2021

Related U.S. Application Data

(63) Continuation of application No. 16/406,454, filed on May 8, 2019, now Pat. No. 11,092,822.

(51) Int. Cl.
*G02C 7/02* (2006.01)
*G02C 7/10* (2006.01)
*G02C 7/04* (2006.01)

(52) U.S. Cl.
CPC ............ *G02C 7/022* (2013.01); *G02C 7/024* (2013.01); *G02C 7/027* (2013.01); *G02C 7/046* (2013.01); *G02C 7/049* (2013.01); *G02C 7/102* (2013.01)

(58) Field of Classification Search
None
See application file for complete search history.

(56) References Cited

U.S. PATENT DOCUMENTS

| 5,235,358 | A | 8/1993 | Mutzhas et al. |
| 5,938,795 | A | 8/1999 | Molock et al. |
| 11,092,822 | B2 * | 8/2021 | Duis .................. G02C 7/027 |
| 2011/0249235 | A1 | 10/2011 | Duis et al. |
| 2012/0176657 | A1 | 7/2012 | Marinelli |
| 2014/0036225 | A1 | 2/2014 | Chehab et al. |
| 2017/0285370 | A1 | 10/2017 | Leip |
| 2020/0355940 | A1 | 11/2020 | Duis et al. |
| 2020/0355941 | A1 | 11/2020 | Duis et al. |

FOREIGN PATENT DOCUMENTS

| EP | 1589367 A1 | 7/2005 |
| EP | 2851713 A1 | 3/2015 |
| WO | 2020225622 A1 | 11/2020 |

OTHER PUBLICATIONS

PCT International Preliminary Report on Patentability, dated Nov. 2, 2021, for PCT Int'l Appln. No. PCT/IB2020/053519.
PCT International Search Report, dated Jul. 16, 2020, for PCT Int'l Appln. No. PCT/IB2020/053519.

* cited by examiner

*Primary Examiner* — Darryl J Collins

(57) ABSTRACT

A photochromic ophthalmic lens may comprise a main body comprising an optical zone and a peripheral zone disposed adjacent the optical zone, wherein one or more of the optical zone and the peripheral zone comprises a photochromic dye, wherein the ophthalmic lens has a thickness profile that is configured based on cosmetic appearance associated with a target level of transmission (% T), and wherein at least a portion of the thickness profile is the same across two or more stock keeping units (SKU), each of the two or more SKU having a different target prescription.

31 Claims, 11 Drawing Sheets

PHOTOCHROMIC SOFT CONTACT LENS WITH COSMETIC AND EFFICACY CONSIDERATIONS

RELATED APPLICATIONS

This application is a continuation of U.S. patent application Ser. No. 16/406,454, filed May 8, 2019.

BACKGROUND

Soft contact lenses are primarily designed for correcting vision impairment, but other aspects of the lens are also considered during the design process such as handling (e.g., for lens insertion and removal), comfort, fit, or any other aspect that required consideration during the design process. Standard cosmetic lenses such as colored lenses provide cosmetic enhancement in the corneal region. A printed pattern and/or colored region may have a potential negative impact on the optical performance of the lens. As such, conventional printed pattern and/or colored regions are limited and do not extend to or cover a sclera of the eye and/or the pupil.

For lenses with large power correction, whether the lens is an edge to edge photochromic lens or center only photochromic lens, significant variation in thickness is present in that optical region. High plus lenses will have a thick central optic region, while high minus lenses with have a thick peripheral optic region. Those significant variations in thickness within the optic zone will also have an impact on the cosmetic aspects of the lens.

Improvements are needed.

SUMMARY

In the present disclosure, a soft contact lens may comprise or may be formed from a monomer mix comprising a photochromic dye material. In the case where the photochromic dye is fully mixed with the lens material monomer, the photochromic region may cover the entire surface of the lens, affecting not only the corneal region of the eye but also the sclera. Once the lens is on eye and that the photochromic dye is activated, the outer region of the lens will darken. If the peripheral thickness of the lens and the amount of photochromic dye are not correctly chosen, then the lens edge to sclera transition will not appear cosmetically appealing to the wearer due to the rapid change in darkness in that region. Furthermore, the vision correction provided by contact lenses is usually obtained by adjusting the refractive power within the optical region.

The present disclosure may address the visual effect where the lens thickness profile is designed to optimize the color change and the aspect of the lens on eye when the photochromic dye is activated. The present disclosure relates to a soft contact lens with either edge to edge photochromic material or center only photochromic material, where the optical region and the peripheral region of the lens are designed to give a desirable cosmetic effect on eye. Determining a desirable cosmetic effect, as used herein, may be based on a clinical evaluation based on a questionnaire relating to the subjective appearance of the lens.

To the benefit of the soft contact lens wearer the photochromic effect within the pupil region ideally would remain constant across its aperture. However, because power is a function of thickness change in the optical region this cannot be achieved. What is called photochromic effect is the amount of light transmitted to the eye, described as % T that represents the percentage of light going through when the dye is activated. One solution may be achieved by offsetting the front surface curvature from the back surface by a certain amount such that the radial thickness along the region remains constant, where the radial thickness is the lens thickness calculated in the direction perpendicular to the back surface of the lens. This setting provides the same amount of % T independently of the region of the lens used. But, vision correction obtained by the means of refractive power cannot be achieved with this approach as, based on the rules of refraction (Snell's law of refraction), the front and back surfaces of the lens need to have different curvatures to provide a specific refractive power.

Alternatively, or additionally, the photochromic effect in the peripheral region may be substantially similar to the inner region. Substantially similar photochromic effect may be defined, for example, as a darkness or % T difference between the two regions within a threshold. Thresholds may be determined through clinical evaluation where subjects will be asked about the cosmetic aspect of multiple lenses within the optic zone or outside the optic zone. Lenses may vary in geometry and/or percentage of photochromic dye. Thresholds may be determined using optical modeling of the transmitted light through different regions of the lens (central region versus inner/outer periphery) to establish thresholds/tolerances around the cosmetic aspects of the lens. These thresholds may also change depending on the target population driven by the type of daily activities for example.

If the peripheral region is much thicker than the optical region, the periphery will look much darker and will not be cosmetically appealing to the wearer. Such conditions will occur with lenses of high minus powers, as shown in FIG. 1, where the center thickness is minimum and peripheral thickness is maximum providing the largest thickness difference. Similarly, for lenses with high plus power, as shown in FIG. 2, a large thickness difference will occur between the edge of the optic zone and the peripheral region.

A photochromic ophthalmic lens may comprise a main body comprising an optical zone and a peripheral zone disposed adjacent the optical zone, wherein one or more of the optical zone and the peripheral zone comprises a photochromic dye, wherein the ophthalmic lens has a thickness profile that is configured based on cosmetic appearance associated with a target level of transmission (% T), and wherein at least a portion of the thickness profile is the same across two or more stock keeping units (SKU), each of the two or more SKU having a different target prescription.

A photochromic ophthalmic lens may comprise a main body comprising an optical zone and a peripheral zone disposed adjacent the optical zone, wherein one or more of the optical zone and the peripheral zone comprises a photochromic dye, wherein the ophthalmic lens has a thickness profile that is configured a target level of transmission (% T), and wherein at least a portion of the thickness profile is the same across two or more stock keeping units (SKU), each of the two or more SKU having a different target prescription.

A photochromic ophthalmic lens may comprise a main body comprising an optical zone and a peripheral zone disposed adjacent the optical zone, wherein one or more of the optical zone and the peripheral zone comprises a photochromic dye; and wherein the ophthalmic lens has a thickness profile that is configured based on a target level of transmission (% T).

BRIEF DESCRIPTION OF THE DRAWINGS

The following drawings show generally, by way of example, but not by way of limitation, various examples discussed in the present disclosure. In the drawings.

DETAILED DESCRIPTION

In the present disclosure, a contact lens may comprise a front surface or surface power, a back surface or base curve, and an edge. The front and back surface of the lens may be defined by at least three regions, the inner region from which the vision correction is obtained, the outer periphery of the lens that provides mechanical stability of the lens on eye, and an intermediate region located between the inner region and the outer region used for blending the two aforementioned regions in a smooth manner such that discontinuities do not occur.

The "optical zone" may be defined as the substantially central portion of the lens which contains the visual power correction for the wearer's ametropia and/or presbyopia. "Ametropia" may be defined as the optical power needed to provide good visual acuity, generally at far distance. It is recognized that this would include myopia or hyperopia. Presbyopia is corrected by adding algebraically positive optical power to a portion of the optical zone to correct the wearer near visual acuity requirements. It is recognized that these optical powers may be created by refractive means, or diffractive means, or both.

The peripheral zone may provide stabilization of the lens on the eye including, centration and orientation. That region of the lens provides also the mechanical properties such as handling related to ease of insertion and ease of removal, comfort and fit. The lens tightness on the eye drives either a loose fit which could lead to too much movement or a tight fit which could lead to not enough movement. Orientation stabilization is fundamental when the optical zone contains non-rotationally symmetric features, such as astigmatic correction and/or high order aberrations correction. The intermediate zone ensures that the optical zone and the peripheral zone are blended with tangent curves. It is important to note that both the optical zone and the peripheral zone can be designed independently, though sometimes their designs are strongly related when specific requirements are necessary. For example, the design of a toric lens with an astigmatic optical zone might require a peripheral zone for keeping the lens at a predetermined orientation on the eye.

The photochromic effect may be obtained cosmetically with a constant thickness (e.g., within +/−0.020 mm) across the inner and outer region of the lens. This cannot be achieved in the inner region of the lens as the vision correction is usually obtained through refractive power requiring a thickness change either at the center of the lens or at the edge of the optic zone to accommodate for the change in curvature of the front surface of the lens.

Figure 1:
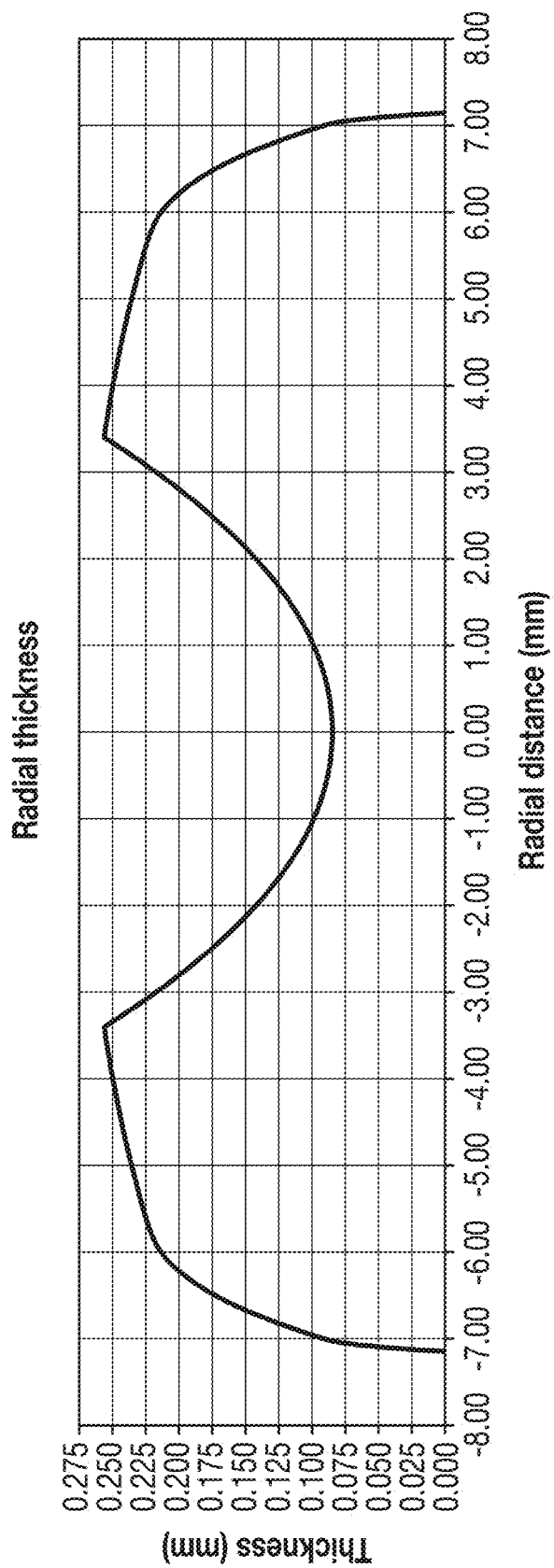
FIG. 1 is a cross-section of a high minus lens (e.g., optical power below −6.00D).
Figure 2:
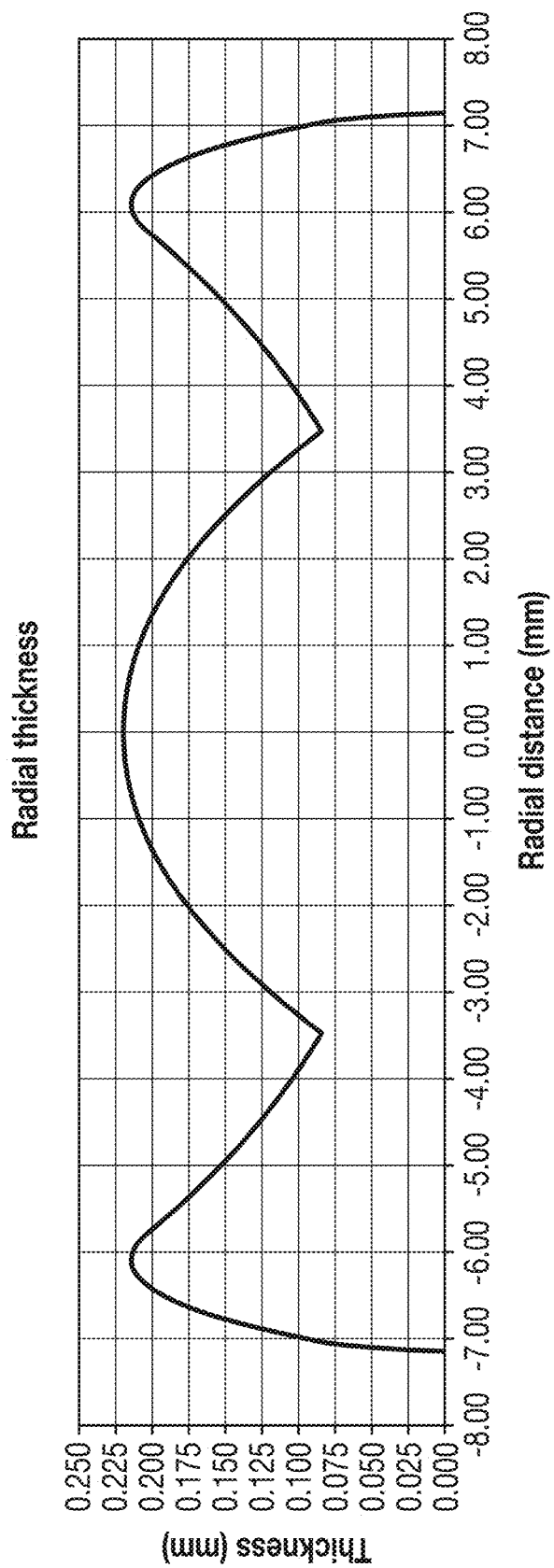
FIG. 2 is a cross-section of a high plus power lens (e.g., optical power above +6.00D).
Figure 3A:
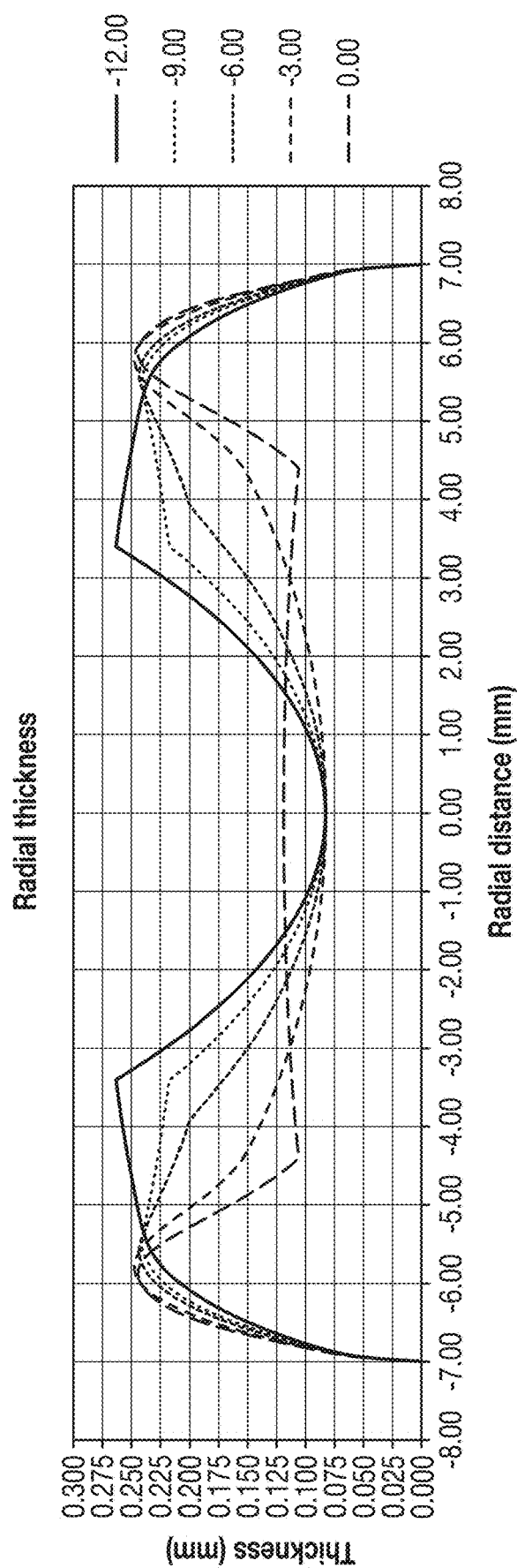
FIGS. 3A-3B show examples of radial peripheral thicknesses for a single vision type contact lenses for multiple SKUs ranging from −12.0D to +8.00D.
Figure 3B:
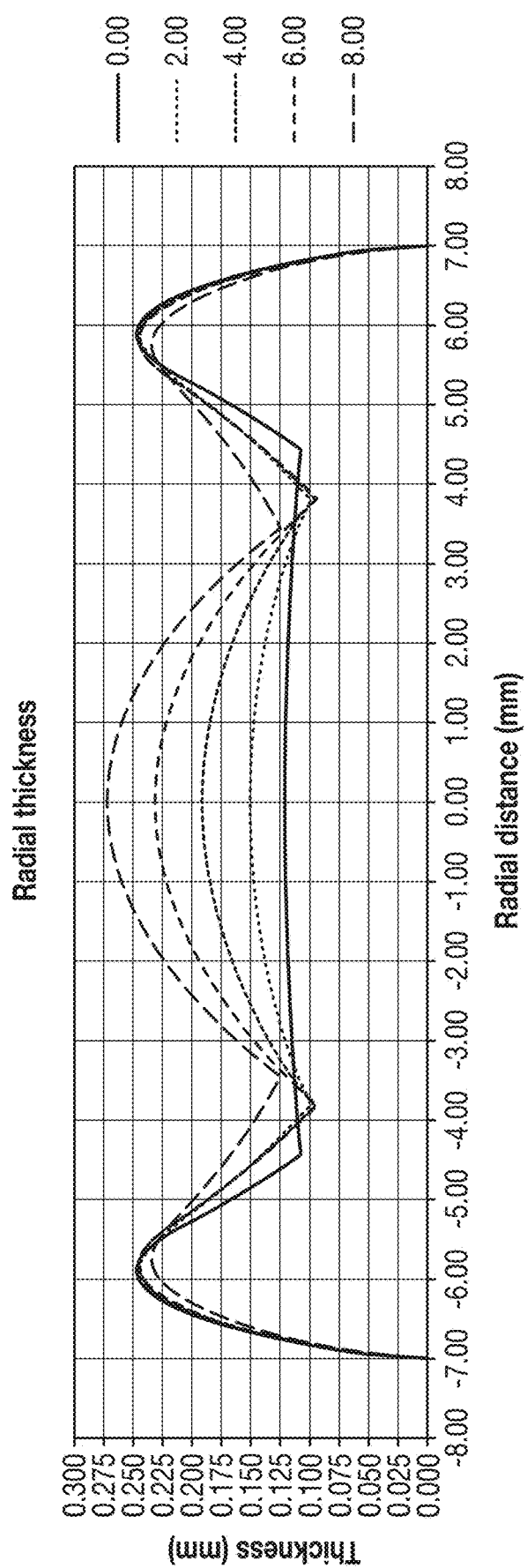

FIG. 3 is a typical example of lens radial thickness for SKUs ranging from −12.0D to 8.00D for single vision soft contact lenses. The center thickness (CT) might vary from 0.70 mm to 0.270 mm across the full SKU range with a minimum thickness and maximum thickness value driven by the lens material refractive index, choice of optic zone diameter and lens material mechanical properties. The maximum peripheral thickness (PT) might also vary based on the same lens material and lens design choices as for the CT.

In an aspect of the present disclosure, the photochromic effect in the central region of the soft contact lens is achieved by providing a constant center thickness (e.g., within +/−0.020 mm) across two or more prescription ranges (e.g., SKUs). The center thickness can be chosen according to the amount of photochromic dye mixed with the monomer and/or the desired level of darkness that lens presents when the photochromic dye is activated. The proposed solution gives a similar photochromic effect across SKUs, within the inner region of the optical zone, provided that the difference in photochromic effect is due to the change in curvature within the optic zone to accommodate for the desired power correction. This approach has shown desirable effect when the photochromic contact lens is designed specifically for subjects with small pupil diameter under low luminance. Low luminance can be described as light conditions for which the illuminance does not exceeding 400 lux. Light conditions such as an overcast day, sunrise or sunset on a clear day, office lighting and moderate level of indoor light are representative conditions of low luminance. Other applications may be used.

In an aspect of the present disclosure, the photochromic effect in the central region of the soft contact lens is achieved by providing a constant radial thickness (e.g., within +/−0.020 mm) within a given diameter inside the optic zone. As an example, the center thickness is adjusted according to the choice of the radial thickness, lens material index, back optic zone radius and power correction. The radial thickness can be chosen according to the amount of photochromic dye mixed with the monomer and/or the desired level of darkness that lens presents when the photochromic dye is activated. The proposed solution gives a similar photochromic effect across SKUs, toward the outer region of the optical zone, provided that the difference in photochromic effect is due to the change in curvature within the optic zone to accommodate for the desired power correction. This approach is preferred if the photochromic contact lens is designed specifically for subjects with large pupil diameter under low luminance.

In an aspect of the present disclosure, the photochromic effect in the central region of the soft contact lens is achieved by providing a constant harmonic radial thickness (e.g., within +/−0.020 mm) within a given diameter inside the optic zone. The center thickness is adjusted according to the choice of the harmonic radial thickness, lens material index, back optic zone radius and power correction. The harmonic radial thickness can be chosen according to the amount of photochromic dye mixed with the monomer and/or the desired level of darkness that lens presents when the photochromic dye is activated. The proposed solution gives a similar photochromic effect across SKUs, provided that the difference in photochromic effect is due to the change in curvature within the optic zone to accommodate for the desired power correction. Such solution also minimizes the lens volume within the selected diameter that would help the manufacturing process, particularly for center only photochromic lenses, as the amount of photochromic material to be dispensed would be the same.

In an aspect of the present disclosure, the optical region of the lens is designed to provide a photochromic effect. The photochromic effect can be obtained based on one or more of the proposed solutions according to the present disclosure. The thickness within the optical region can be adjusted based on the desired darkness driven by the amount of photochromic dye present in the monomer mix. For low concentration of photochromic dye, a larger thickness might be required to achieve the same amount of darkness that can be obtained with a larger concentration of photochromic dye. The thickness could also be adjusted based on the desired amount of % T that might also lead to a different level of darkness.

For someone skilled in the art of designing soft contact lenses it is known that a thicker peripheral region provides better handling performance. Thickness in the peripheral region is driven by the material stiffness. Stiffer lens material requires less thickness in the periphery to achieve the same handling performance than a softer material. The difference in thickness between the edge of the optic zone and inner region of the periphery is managed through the intermediate region which purpose is to blend both regions in a smooth manner. For a photochromic lens a compromise might be required for the peripheral thickness such that the peripheral region of the lens is thicker than the inner region of the lens to maintain handling and still provide better cosmetic effect than a regular lens.

Other criteria may also be considered during the lens design process such as lens inversion, lens folding, lens wrapping usually evaluated through FEA modeling. Such criteria, related to the lens mechanical performance, can also be included during the process of optimizing the cosmetic effect and adjusted according to the desired lens performance.

For refractive power based soft contact lenses the optic zone diameter varies across the SKU range due to thickness constraint. High minus lenses, requiring flat front curvatures, have smaller optic zone diameters than low power lenses due to the large thickness at the edge of the optic zone. To control the thickness at that location the optic zone diameter is reduced such that the thickness is about of the same magnitude than the maximum peripheral thickness (FIG. 3). High plus lenses, requiring stepper front curvatures, also have smaller optic zone diameters than low power lenses due to large thickness at the center of the optic zone. To control the thickness at that location the optic zone diameter is reduced such that the center thickness is about of the same magnitude than the maximum peripheral thickness. Thus, more than one of the proposed solutions may have to be applied to achieve the desired photochromic effect and cosmetic performance based on the projected SKU range.

EXAMPLES

Figure 4A:
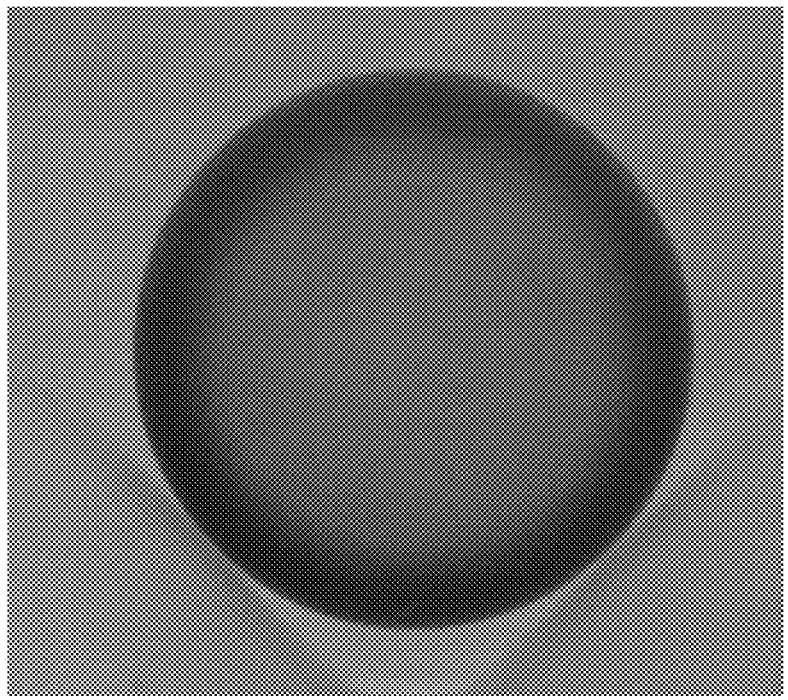
FIGS. 4A and 4B illustrate an example of a soft contact lens containing 1% of photochromic dye that has been activated and one containing 4% of photochromic dye that has been activated.
Figure 4B:
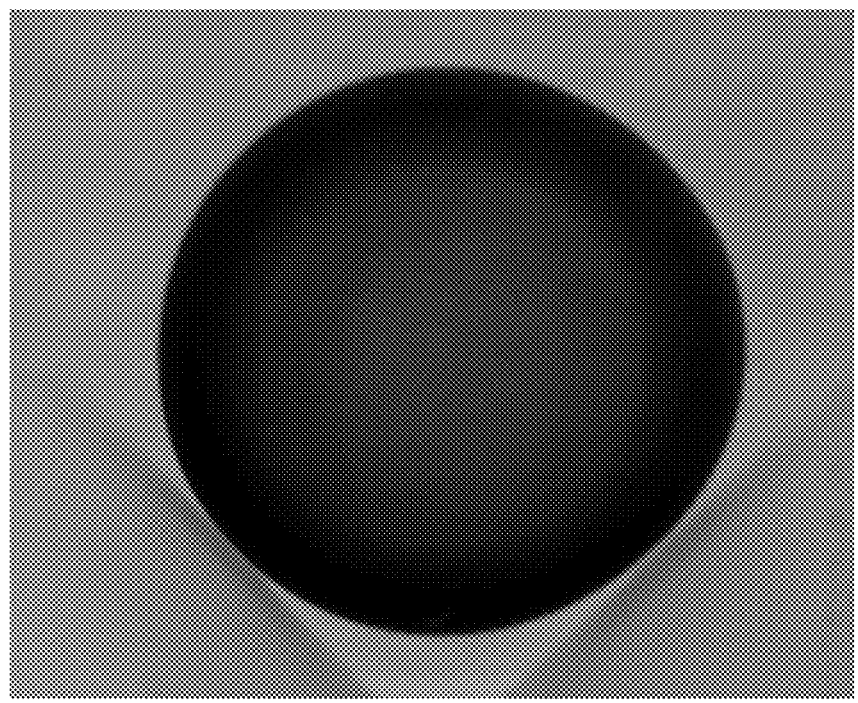

In FIGS. 4A and 4B a photochromic lens was obtained using the standard geometry of a soft contact lens such as an Acuvue2 lens. The prescription of that lens is −1.00D sphere power. The amount of dye between the first example (A) and second example (B) varies from 1.0% to 4.0%. Both images depict the lens when the photochromic dye is activated. In each case it is possible to discern the optic zone from the periphery of the lens because of the difference in darkness. In that example the lens center thickness is about 0.124 mm and the maximum peripheral thickness is about 0.240 mm.

Figure 5:
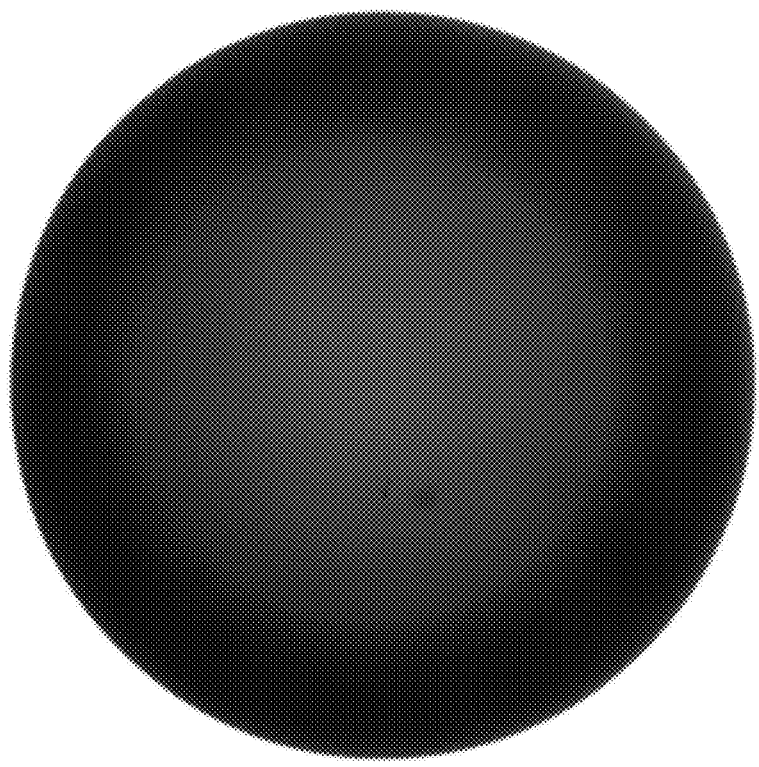
FIG. 5 is an example of a soft contact lens containing 4% of photochromic dye that has been activated.

In a second example (FIG. 5), a −1.00D sphere power photochromic lens was obtained using 1% of photochromic dye added to the monomer mix. The lens center thickness is about 0.080 mm and the maximum peripheral thickness is about 0.203 mm. Similar to the previous example, the optic zone is lighter in darkness than the peripheral region of the lens. Both regions are very distinct to each other when the photochromic dye is activated.

Table 1 below describes the OZ geometry of a soft contact lens where the photochromic effect in the central region of the soft contact lens is achieved by providing a constant center thickness (e.g., within +/−0.020 mm) across two or more prescriptions (e.g., SKUs). The lens diameter-base curve combination was chosen to be 14.20 mm/8.40 mm with a material refractive index value of 1.42. In the provided example the center thickness was set to 0.240 mm.

TABLE 1

| Rx | Center thickness | Front radius | OZ diam | OZ jct. thick. | Front Sag height | Volume |
|---|---|---|---|---|---|---|
| −6.00 | 0.240 | 9.6164 | 8.125 | 0.341 | 0.3306 | 5.193 |
| −5.75 | 0.240 | 9.5625 | 8.235 | 0.339 | 0.3326 | 5.175 |
| −5.50 | 0.240 | 9.5092 | 8.344 | 0.336 | 0.3345 | 5.156 |
| −5.25 | 0.240 | 9.4565 | 8.452 | 0.334 | 0.3364 | 5.137 |
| −5.00 | 0.240 | 9.4043 | 8.556 | 0.031 | 0.3384 | 5.119 |
| −4.75 | 0.240 | 9.3528 | 8.655 | 0.327 | 0.3403 | 5.100 |
| −4.50 | 0.240 | 9.3018 | 8.750 | 0.323 | 0.3423 | 5.081 |
| −4.25 | 0.240 | 9.2513 | 8.839 | 0.319 | 0.3442 | 5.063 |
| −4.00 | 0.240 | 9.2014 | 8.920 | 0.315 | 0.3461 | 5.044 |
| −3.75 | 0.240 | 9.1521 | 8.995 | 0.310 | 0.3481 | 5.025 |
| −3.50 | 0.240 | 9.1032 | 9.060 | 0.304 | 0.3500 | 5.007 |
| −3.25 | 0.240 | 9.0549 | 9.117 | 0.299 | 0.3520 | 4.988 |
| −3.00 | 0.240 | 9.0072 | 9.164 | 0.293 | 0.3539 | 4.969 |
| −2.75 | 0.240 | 8.9599 | 9.202 | 0.287 | 0.3558 | 4.951 |
| −2.50 | 0.240 | 8.9131 | 9.228 | 0.281 | 0.3578 | 4.932 |
| −2.25 | 0.240 | 8.8668 | 9.245 | 0.274 | 0.3597 | 4.913 |
| −2.00 | 0.240 | 8.8210 | 9.250 | 0.267 | 0.3617 | 4.894 |
| −1.75 | 0.240 | 8.7756 | 9.250 | 0.261 | 0.3636 | 4.876 |
| −1.50 | 0.240 | 8.7308 | 9.250 | 0.254 | 0.3656 | 4.857 |
| −1.25 | 0.240 | 8.6864 | 9.250 | 0.247 | 0.3675 | 4.838 |
| −1.00 | 0.240 | 8.6424 | 9.250 | 0.240 | 0.3695 | 4.819 |
| −0.75 | 0.240 | 8.5989 | 9.250 | 0.234 | 0.3714 | 4.801 |
| −0.50 | 0.240 | 8.5558 | 9.250 | 0.227 | 0.3734 | 4.782 |
| −0.25 | 0.240 | 8.5132 | 9.250 | 0.220 | 0.3754 | 4.763 |
| 0.00 | 0.240 | 8.4710 | 9.250 | 0.213 | 0.3773 | 4.744 |
| Min | 0.240 | | | 0.213 | | 4.744 |
| Max | 0.240 | | | 0.341 | | 5.193 |
| % range/Max | 0.0 | | | 37.5 | | 8.6 |

Figure 6:
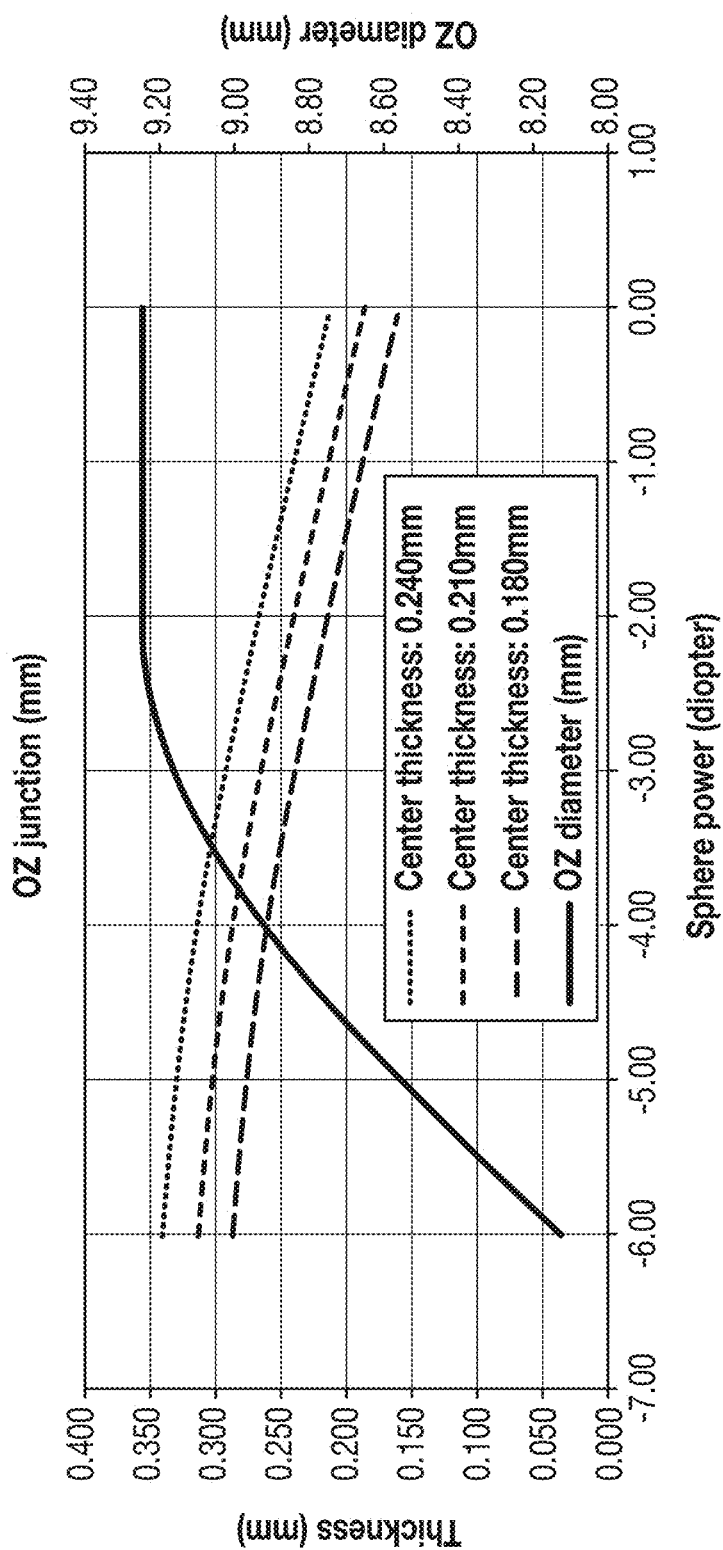
FIG. 6 depicts the optic zone junction thickness for three different levels of center thickness, 0.240 mm, 0.210 mm and 0.180 mm.
Figure 7:
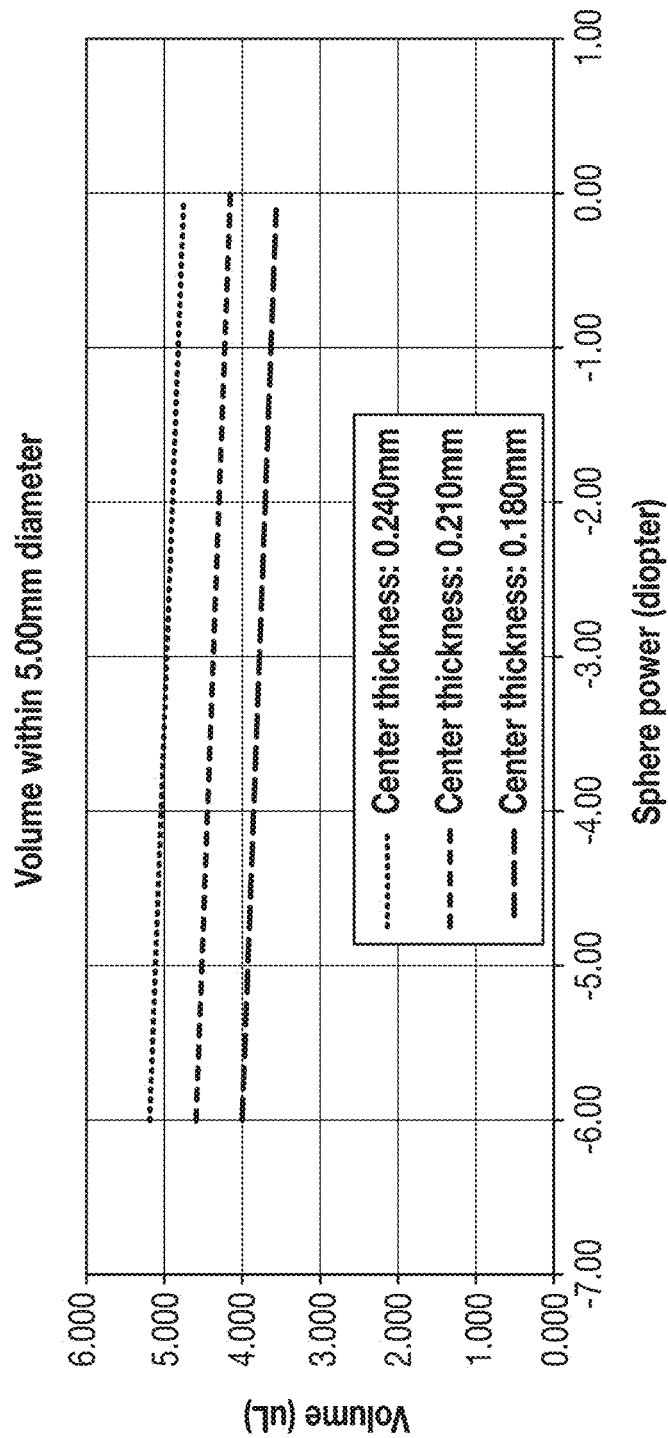
FIG. 7 depicts the volume within the central region of the lens calculated over an arbitrary 5.00 mm diameter.

FIG. 6 depicts the optic zone junction thickness for three different levels of center thickness, 0.240 mm, 0.210 mm and 0.180 mm. The optic zone junction thickness is the radial thickness at the edge of the optic zone. FIG. 6 also provides the arbitrary optic zone diameter that was used to obtain the optic zone junction thickness data. FIG. 7 depicts the volume within the central region of the lens calculated over an arbitrary 5.00 mm diameter. The volume decreases with the decrease in center thickness. The rate of change in volume remains independent of the center thickness within the provided SKU range (−6.00D to +0.00D). Preferably the variation in lens volume needs to remain small to minimize the variation in % T across the selected diameter. The diameter chosen for setting the optic zone junction thickness can also be selected according to a specific population. For example, if the lens is designed specifically for subjects with small pupil size then a diameter within a 3.00 mm to 4.50 mm can be selected. if the lens is designed specifically for subjects with large pupil size then a diameter within a 6.50 mm to 8.00 mm can be selected, or if the lens is designed specifically for subjects with medium pupil size then a diameter within a 4.50 mm to 6.50 mm can be selected. The proposed approach is applicable either for an edge to edge type or center only type photochromic lens.

The optic zone junction thickness may be the result of the choice of the base curve, lens material refractive index, center thickness and optic zone diameter combination. Equivalent results can be achieved with a different combination of the mentioned parameters. Those parameters should be adjusted based on the choice of the lens material (modulus) that drives lens stiffness and thus handling performance, the percentage of photochromic dye and/or darkness that drives the cosmetic appearance.

Table 2 below describes the geometry of a soft contact lens where the photochromic effect in the central region of the soft contact lens is achieved by providing a constant radial thickness (e.g., within +/−0.020 mm) within a given diameter inside the optic zone. The lens diameter-base curve combination was chosen to be 14.20 mm/8.40 mm with a material refractive index value of 1.42. In the provided example the radial thickness was set to 0.210 mm at a diameter of 8.00 mm.

TABLE 2

| Rx | Center thickness | Front radius | OZ diam | OZ jct. thick. | Front Sag height | Volume |
|---|---|---|---|---|---|---|
| −6.00 | 0.096 | 9.5738 | 8.125 | 0.210 | 0.3322 | 2.351 |
| −5.75 | 0.098 | 9.5205 | 8.235 | 0.210 | 0.3341 | 2.373 |
| −5.50 | 0.100 | 9.4679 | 8.344 | 0.210 | 0.3360 | 2.401 |
| −5.25 | 0.103 | 9.4160 | 8.452 | 0.210 | 0.3379 | 2.436 |
| −5.00 | 0.106 | 9.3648 | 8.556 | 0.210 | 0.3399 | 2.478 |
| −4.75 | 0.110 | 9.3142 | 8.655 | 0.210 | 0.3418 | 2.529 |
| −4.50 | 0.114 | 9.2644 | 8.750 | 0.210 | 0.3437 | 2.588 |
| −4.25 | 0.118 | 9.2153 | 8.839 | 0.210 | 0.3456 | 2.656 |
| −4.00 | 0.123 | 9.1668 | 8.920 | 0.210 | 0.3475 | 2.733 |
| −3.75 | 0.128 | 9.1190 | 8.995 | 0.210 | 0.3494 | 2.818 |
| −3.50 | 0.134 | 9.0719 | 9.060 | 0.210 | 0.3513 | 2.912 |
| −3.25 | 0.140 | 9.0254 | 9.117 | 0.210 | 0.3532 | 3.014 |
| −3.00 | 0.147 | 8.9795 | 9.164 | 0.210 | 0.3550 | 3.124 |
| −2.75 | 0.153 | 8.9343 | 9.202 | 0.210 | 0.3569 | 3.240 |
| −2.50 | 0.161 | 8.8896 | 9.228 | 0.210 | 0.3588 | 3.362 |
| −2.25 | 0.168 | 8.8455 | 9.245 | 0.210 | 0.3606 | 3.488 |
| −2.00 | 0.175 | 8.8019 | 9.250 | 0.210 | 0.3625 | 3.618 |
| −1.75 | 0.183 | 8.7588 | 9.250 | 0.210 | 0.3644 | 3.749 |
| −1.50 | 0.191 | 8.7162 | 9.250 | 0.210 | 0.3662 | 3.881 |
| −1.25 | 0.198 | 8.6740 | 9.250 | 0.210 | 0.3681 | 4.013 |
| −1.00 | 0.206 | 8.6323 | 9.250 | 0.210 | 0.3699 | 4.145 |
| −0.75 | 0.214 | 8.5911 | 9.250 | 0.210 | 0.3718 | 4.277 |
| −0.50 | 0.221 | 8.5503 | 9.250 | 0.210 | 0.3736 | 4.410 |
| −0.25 | 0.229 | 8.5099 | 9.250 | 0.210 | 0.3755 | 4.543 |
| 0.00 | 0.237 | 8.4700 | 9.250 | 0.210 | 0.3774 | 4.676 |
| Min | 0.096 | | | 0.210 | | 2.351 |
| Max | 0.237 | | | 0.210 | | 4.676 |
| % range/Max | 59.4 | | | 0.0 | | 49.7 |

Figure 8:
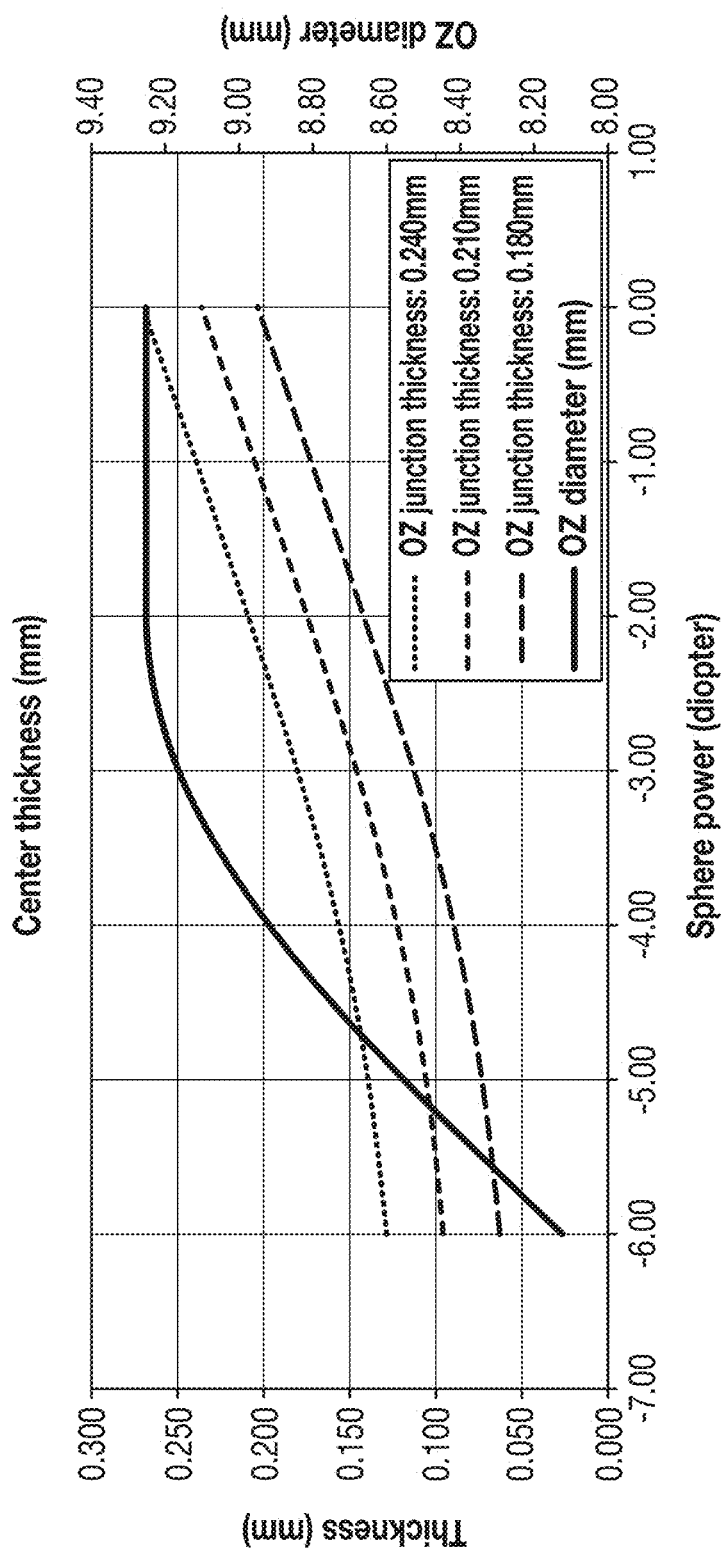
FIG. 8 depicts the center thickness for three different levels of optic zone junction thickness, 0.240 mm, 0.210 mm and 0.180 mm.

FIG. 8 depicts the center thickness for three different levels of optic zone junction thickness, 0.240 mm, 0.210 mm and 0.180 mm. The center thickness was obtained with the same arbitrary optic zone diameter. Larger variation in volume, also calculated over a 5.00 mm diameter, is obtained when keeping the optic zone junction thickness constant across the SKU range (e.g., within +/−0.020 mm). Variation in volume can be reduced by adjusting the optic zone diameter. The proposed approach is applicable either for an edge to edge type or center only type photochromic lens.

The center thickness may be the result of the choice of the base curve, lens material refractive index, optic zone junction thickness and optic zone diameter combination. Equivalent results can be achieved with a different combination of the mentioned parameters. Those parameters should be adjusted based on the choice of the lens material (modulus) that drives lens stiffness and thus handling performance, the percentage of photochromic dye and/or darkness that drives the cosmetic appearance.

Table 3 below describes the geometry of a soft contact lens where the photochromic effect in the central region of the soft contact lens is achieved by providing a constant harmonic radial thickness within a given diameter inside the optic zone (e.g., within +/−0.020 mm). The lens diameter-base curve combination was chosen to be 14.20 mm/8.40 mm with a material refractive index value of 1.42. In the provided example the harmonic radial thickness was set to 0.240 mm at a diameter of 5.00 mm.

TABLE 3

| Rx | Center thickness | Front radius | OZ diam | OZ jct. thick. | Front Sag height | Harmonic thickness | Volume |
|---|---|---|---|---|---|---|---|
| −6.00 | 0.222 | 9.6110 | 8.125 | 0.324 | 0.3308 | 0.240 | 4.831 |
| −5.75 | 0.223 | 9.5573 | 8.235 | 0.323 | 0.3328 | 0.240 | 4.830 |
| −5.50 | 0.223 | 9.5043 | 8.344 | 0.321 | 0.3347 | 0.240 | 4.829 |
| −5.25 | 0.224 | 9.4518 | 8.452 | 0.319 | 0.3366 | 0.240 | 4.828 |
| −5.00 | 0.225 | 9.3999 | 8.556 | 0.317 | 0.3385 | 0.240 | 4.827 |
| −4.75 | 0.226 | 9.3486 | 8.655 | 0.315 | 0.3405 | 0.240 | 4.826 |
| −4.50 | 0.227 | 9.2979 | 8.750 | 0.312 | 0.3424 | 0.240 | 4.825 |
| −4.25 | 0.228 | 9.2477 | 8.839 | 0.308 | 0.3443 | 0.240 | 4.824 |
| −4.00 | 0.229 | 9.1981 | 8.920 | 0.305 | 0.3463 | 0.240 | 4.823 |
| −3.75 | 0.230 | 9.1490 | 8.995 | 0.301 | 0.3482 | 0.240 | 4.822 |
| −3.50 | 0.231 | 9.1005 | 9.060 | 0.296 | 0.3501 | 0.240 | 4.822 |
| −3.25 | 0.232 | 9.0524 | 9.117 | 0.291 | 0.3521 | 0.240 | 4.821 |
| −3.00 | 0.232 | 9.0049 | 9.164 | 0.286 | 0.3540 | 0.240 | 4.820 |
| −2.75 | 0.233 | 8.9579 | 9.202 | 0.281 | 0.3559 | 0.240 | 4.820 |
| −2.50 | 0.234 | 8.9114 | 9.228 | 0.276 | 0.3579 | 0.240 | 4.819 |
| −2.25 | 0.235 | 8.8654 | 9.245 | 0.270 | 0.3598 | 0.240 | 4.819 |
| −2.00 | 0.236 | 8.8199 | 9.250 | 0.264 | 0.3617 | 0.240 | 4.819 |
| −1.75 | 0.237 | 8.7748 | 9.250 | 0.258 | 0.3637 | 0.240 | 4.819 |
| −1.50 | 0.238 | 8.7302 | 9.250 | 0.252 | 0.3656 | 0.240 | 4.819 |
| −1.25 | 0.239 | 8.6861 | 9.250 | 0.246 | 0.3675 | 0.240 | 4.818 |
| −1.00 | 0.240 | 8.6424 | 9.250 | 0.240 | 0.3695 | 0.240 | 4.818 |
| −0.75 | 0.241 | 8.5992 | 9.250 | 0.234 | 0.3714 | 0.240 | 4.819 |
| −0.50 | 0.242 | 8.5564 | 9.250 | 0.228 | 0.3734 | 0.240 | 4.819 |
| −0.25 | 0.243 | 8.5140 | 9.250 | 0.222 | 0.3753 | 0.240 | 4.819 |
| 0.00 | 0.244 | 8.4721 | 9.250 | 0.216 | 0.3773 | 0.240 | 4.819 |
| Min | 0.222 | | | 0.216 | | | 4.818 |
| Max | 0.244 | | | 0.324 | | | 4.831 |
| % range/Max | 9.1 | | | 33.3 | | | 0.3 |

The harmonic thickness of a rotationally symmetric contact lens calculated from a series of (h+1) radial thickness measurements at intervals of equal annular area from the center (point 0) to the edge (point h) of the circular area exposed to oxygen flow. The interval between thickness measurements should allow each successive annulus to be of the same area:

$$t_{HM} = \frac{h+1}{\frac{1}{t_0} + \frac{1}{t_1} + \frac{1}{t_2} + \frac{1}{t_3} + \ldots + \frac{1}{t_h}}$$

where: $t_{HM}$ is the harmonic thickness of radially symmetric test sample; $t_{0-h}$ is the radial thickness measured at intervals of equal area from the center ($t_0$) to the edge ($t_h$) of the exposed sample area.

For rotationally symmetric circular lenses such as single vision lenses, as the radial thickness profile do not change angularly, the harmonic thickness can be calculated along any meridian. The outer edge of the lens should be omitted during that calculation as there is no thickness at that location.

For rotationally asymmetric circular lenses such as toric lenses, as the radial thickness profile does change angularly; the harmonic thickness is then determined from the average of the harmonic thickness calculated along multiple meridians around the circumference of the lens. The outer edge of the lens should be omitted during that calculation as there is no thickness at that location.

Figure 9:
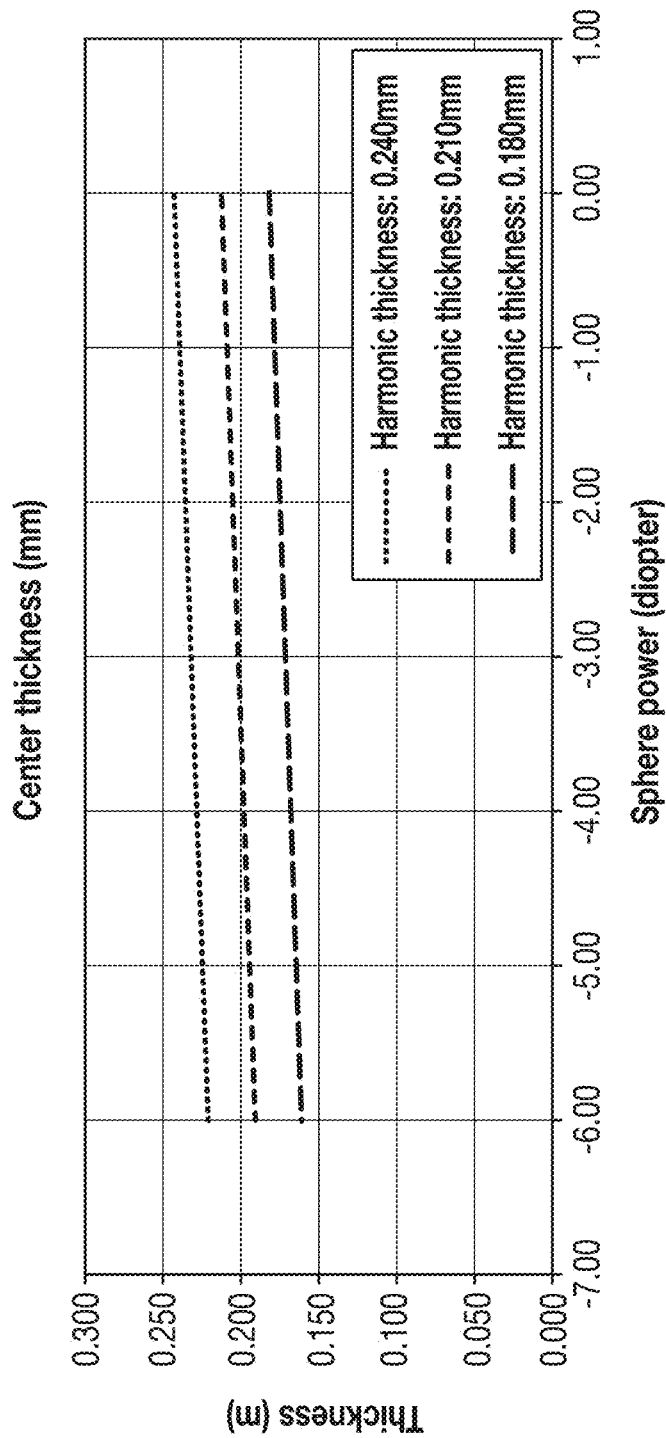
FIG. 9 depicts the center thickness for three different levels of harmonic thickness, 0.240 mm, 0.210 mm and 0.180 mm. The harmonic thickness is calculated over a 5.00 mm diameter.

FIG. 9 depicts the center thickness for three different levels of harmonic thickness, 0.240 mm, 0.210 mm and 0.180 mm. The harmonic thickness is calculated over an arbitrary 5.00 mm diameter. Keeping the harmonic thickness constant results in a constant volume (e.g., within +/−0.020 mm) within the same diameter for which the harmonic thickness is calculated. Similar outcomes are obtained when using the average thickness instead of the harmonic thickness. The use of the harmonic thickness might be more relevant as its calculation method provides the same contribution in thickness over each ring thus harmonizing the amount of light transmitted within the selected diameter. The proposed approach is applicable either for an edge to edge type or center only type photochromic lens.

The center thickness may be the result of the choice of the base curve, lens material refractive index, harmonic thickness and optic zone diameter combination. Equivalent results can be achieved with a different combination of the mentioned parameters. Those parameters should be adjusted based on the choice of the lens material (modulus) that drives lens stiffness and thus handling performance, the percentage of photochromic dye and/or darkness that drives the cosmetic appearance.

Figure 10:
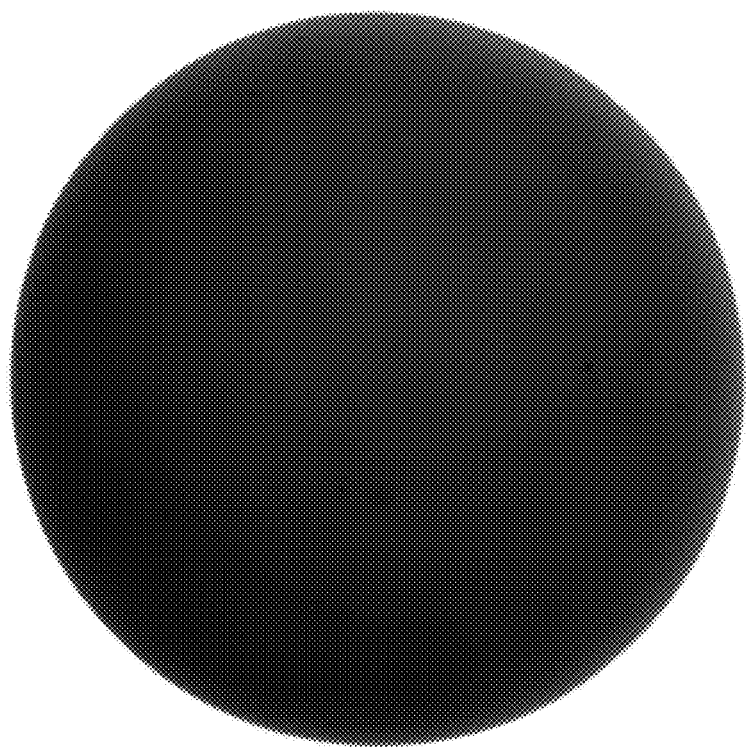
FIG. 10 is an example of a soft contact lens containing 1% of photochromic dye that has been activated.
Figure 11:
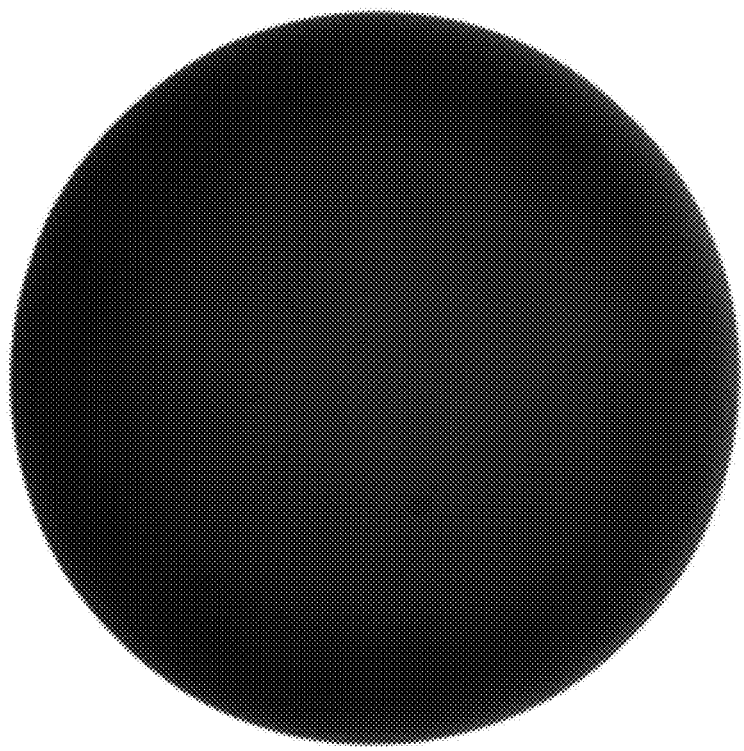
FIG. 11 is an example of a soft contact lens containing 1% of photochromic dye that has been activated.

In FIG. 10, a −1.00D sphere power edge to edge photochromic lens was obtained using 1% of photochromic dye added to the monomer mix. The harmonic thickness was set to 0.160 mm at 7.00 mm diameter with a center thickness of 0.158 mm and a maximum peripheral thickness of 0.190 mm. In another example, FIG. 11, a −1.00D sphere power edge to edge photochromic lens was also obtained using 1% of photochromic dye added to the monomer mix. The harmonic thickness was set to 0.120 mm at 8.00 mm diameter. The lens center thickness is about 0.117 mm and the maximum peripheral thickness is about 0.182 mm. By thickening the optics area while thinning out the peripheral region we can achieve a balance in the darkness over the entire lens while decreasing the amount of transmitted light.

In an aspect of the present disclosure, a soft contact lens may be customized based on the wearers' prescription, the wearer's pupil size under low luminance, and the choice of the amount of transmitted light required.

In an aspect of the present disclosure, the amount of photochromic dye may be gradually adjusted from the lens center to the lens edge such that either the level of darkness or the optical density remains constant over the entire surface of the lens. The photochromic dye can also be adjusted to balance both the level of darkness and the optical density.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated but should be constructed to cohere with all modifications that may fall within the scope of the appended claims.

What is claimed is:

1. A photochromic ophthalmic lens comprising:
a main body comprising an optical zone and a peripheral zone disposed adjacent the optical zone, wherein one or more of the optical zone and the peripheral zone comprises a photochromic dye,
wherein the ophthalmic lens has a thickness profile that is configured based on cosmetic appearance associated with a target level of transmission (%T),
wherein at least a portion of the thickness profile is the same across two or more stock keeping units (SKU), each of the two or more SKU having a different target prescription; and
wherein one or more of the cosmetic appearance or the target level of transmission (%T) is achieved based on configuration of one or more of center thickness, optic zone junction thickness, harmonic thickness, or volume calculated at a specific diameter.

2. The photochromic ophthalmic lens of claim 1, wherein the center thickness is constant across the two or more stock keeping units (SKU) and is configured based on the cosmetic appearance or the target level of transmission (%T), or both.

3. The photochromic ophthalmic lens of claim 1, wherein the optic zone junction thickness is constant across the two or more stock keeping units (SKU) and is configured based on the cosmetic appearance or the target level of transmission (%T), or both.

4. The photochromic ophthalmic lens of claim 1, wherein the harmonic thickness calculated at a specific diameter is constant across the two or more stock keeping units (SKU) and is configured based on the cosmetic appearance or the target level of transmission (%T), or both.

5. The photochromic ophthalmic lens of claim 1, wherein the volume calculated at a specific diameter is constant across the two or more stock keeping units (SKU) and is configured based on the cosmetic appearance or the target level of transmission (%T), or both.

6. The photochromic ophthalmic lens of claim 1, wherein the thickness profile comprises one or more of center thickness, optic zone junction thickness, or harmonic thickness.

7. The photochromic ophthalmic lens of claim 1, wherein the thickness in at least a portion of the peripheral region of the lens is configured based at least on the cosmetic appearance.

8. The photochromic ophthalmic lens of claim 1, wherein the main body is configured based on one or more of a target wearers' prescription or a target wearer's pupil size under low luminance.

9. The photochromic ophthalmic lens of claim 1, wherein an amount of the photochromic dye is gradually adjusted across the main body based on the lens thickness profile to achieve the desired cosmetic appearance or the target level of transmission (%T), or both.

10. A method of making the photochromic ophthalmic lens of claim 1.

11. A method of customizing the photochromic ophthalmic lens of claim 1 for a target wearer, the method comprising:
determining one or more of a prescription of the target wearer or a pupil size of the target wearer;

configuring, based on the determined one or more of a prescription of the target wearer or a pupil size of the target wearer, the thickness profile of the ophthalmic lens.

12. A photochromic ophthalmic lens comprising:
a main body comprising an optical zone and a peripheral zone disposed adjacent the optical zone, wherein one or more of the optical zone and the peripheral zone comprises a photochromic dye,
wherein the ophthalmic lens has a thickness profile that is configured based on a target level of transmission (%T),
wherein at least a portion of the thickness profile is the same across two or more stock keeping units (SKU), each of the two or more SKU having a different target prescription, and
wherein the target level of transmission (%T) is achieved based on configuration of one or more of center thickness, optic zone junction thickness, harmonic thickness, or volume calculated at a specific diameter.

13. The photochromic ophthalmic lens of claim 12, wherein the center thickness is constant across the two or more stock keeping units (SKU) and is configured based on the target level of transmission (%T).

14. The photochromic ophthalmic lens of claim 12, wherein the optic zone junction thickness is constant across the two or more stock keeping units (SKU) and is configured based on the target level of transmission (%T).

15. The photochromic ophthalmic lens of claim 12, wherein the harmonic thickness calculated at a specific diameter is constant across the two or more stock keeping units (SKU) and is configured based on the target level of transmission (%T).

16. The photochromic ophthalmic lens of claim 12, wherein the volume calculated at a specific diameter is constant across the two or more stock keeping units (SKU) and is configured based on the target level of transmission (%T).

17. The photochromic ophthalmic lens of claim 12, wherein the thickness profile comprises one or more of center thickness, optic zone junction thickness, or harmonic thickness.

18. The photochromic ophthalmic lens of claim 12, wherein the main body is configured based on one or more of a target wearers' prescription or a target wearer's pupil size under low luminance.

19. The photochromic ophthalmic lens of claim 12, wherein an amount of the photochromic dye is gradually adjusted across the main body based on the lens thickness profile to achieve the target level of transmission (%T).

20. A method of making the photochromic ophthalmic lens of claim 12.

21. A method of customizing the photochromic ophthalmic lens of claim 12 for a target wearer, the method comprising:
determining one or more of a prescription of the target wearer or a pupil size of the target wearer;
configuring, based on the determined one or more of a prescription of the target wearer or a pupil size of the target wearer, the thickness profile of the ophthalmic lens.

22. A photochromic ophthalmic lens comprising:
a main body comprising an optical zone and a peripheral zone disposed adjacent the optical zone, wherein one or more of the optical zone and the peripheral zone comprises a photochromic dye;
wherein the ophthalmic lens has a thickness profile that is configured based on a target level of transmission (%T); and
wherein the target level of transmission (%T) is achieved based on configuration of one or more of center thickness, optic zone junction thickness, harmonic thickness, or volume calculated at a specific diameter.

23. The photochromic ophthalmic lens of claim 22, wherein the center thickness is constant across the two or more stock keeping units (SKU) and is configured based on the target level of transmission (%T).

24. The photochromic ophthalmic lens of claim 22, wherein the optic zone junction thickness is constant across the two or more stock keeping units (SKU) and is configured based on the target level of transmission (%T).

25. The photochromic ophthalmic lens of claim 22, wherein the harmonic thickness calculated at a specific diameter is constant across the two or more stock keeping units (SKU) and is configured based on the target level of transmission (%T).

26. The photochromic ophthalmic lens of claim 22, wherein the volume calculated at a specific diameter is constant across the two or more stock keeping units (SKU) and is configured based on the target level of transmission (%T).

27. The photochromic ophthalmic lens of claim 22, wherein the thickness profile comprises one or more of center thickness, optic zone junction thickness, or harmonic thickness.

28. The photochromic ophthalmic lens of claim 22, wherein the main body is configured based on one or more of a target wearers' prescription or a target wearer's pupil size under low luminance.

29. The photochromic ophthalmic lens of claim 22, wherein an amount of the photochromic dye is gradually adjusted across the main body based on the lens thickness profile to achieve the target level of transmission (%T).

30. A method of making the photochromic ophthalmic lens of claim 22.

31. A method of customizing the photochromic ophthalmic lens of claim 22 for a target wearer, the method comprising:
determining one or more of a prescription of the target wearer or a pupil size of the target wearer;
configuring, based on the determined one or more of a prescription of the target wearer or a pupil size of the target wearer, the thickness profile of the ophthalmic lens.

* * * * *